March 27, 1928.
F. R. THALKEN
POULTRY WATER FOUNTAIN
Filed Dec. 2, 1926
1,664,186
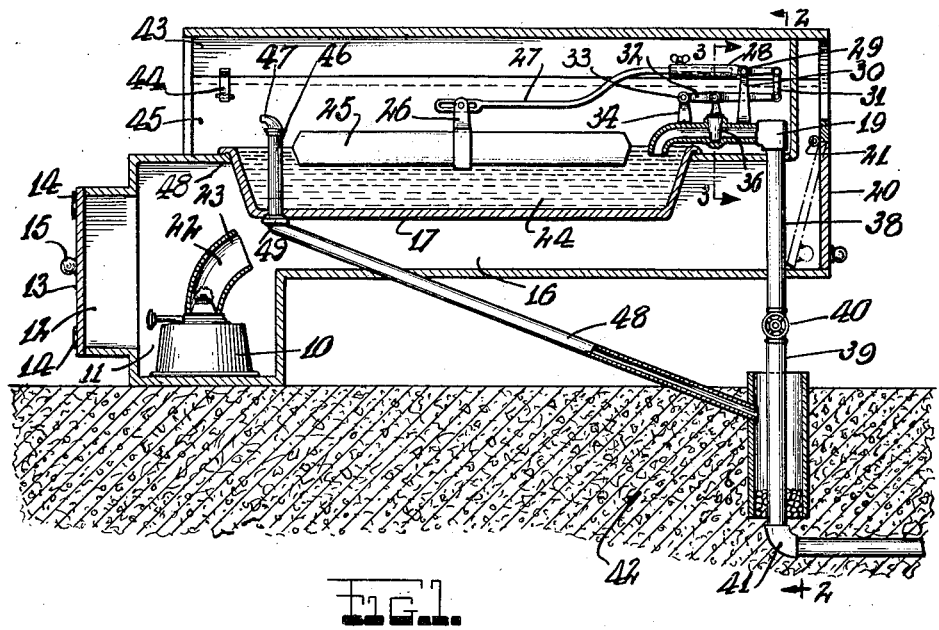
FIG.1.
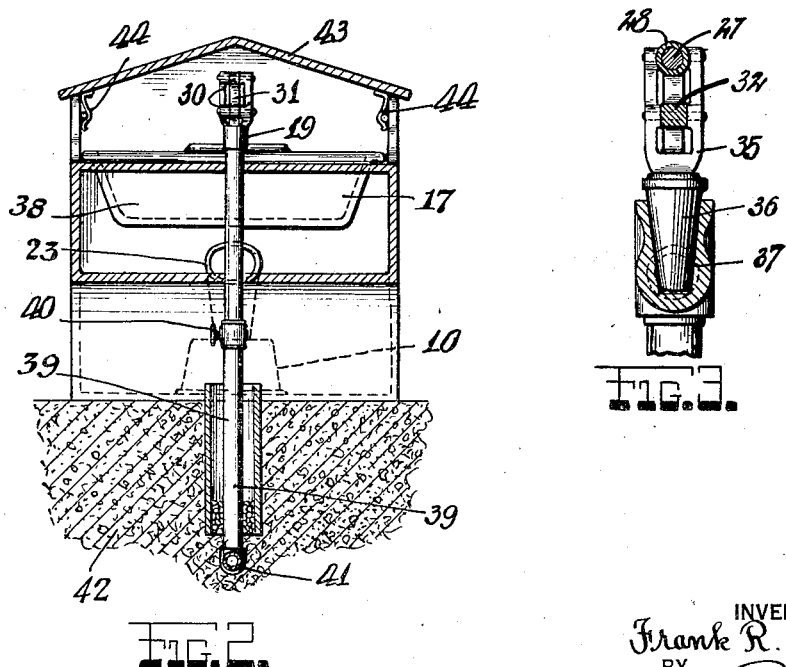
FIG.2.
FIG.3.
INVENTOR
Frank R. Thalken
BY
ATTORNEY Patented Mar. 27, 1928.

1,664,186

UNITED STATES PATENT OFFICE.

FRANK R. THALKEN, OF VINELAND, NEW JERSEY.

POULTRY WATER FOUNTAIN.

Application filed December 2, 1926. Serial No. 152,110.

This invention relates to a new and useful device in the nature of a poultry water fountain particularly adapted to keep the chill off the water in cold weather and to prevent the cold and frost from freezing the water supplied thereto.

The object of the invention is to provide a poultry water fountain of novel construction and arrangement of parts, hereinafter more fully described, claimed, and illustrated in the accompanying drawing, in which:

Fig. 1 shows a longitudinal vertical sectional view of my improved poultry water fountain.

Fig. 2 shows an end elevational view thereof, certain parts being removed so as to more clearly show the construction thereof, taken on the line 2—2 of Fig. 1.

Fig. 3 shows an enlarged vertical sectional view taken on the line 4—4 of Fig. 1.

As here embodied my improved poultry water fountain comprises a lamp 10, such as commonly used to burn kerosene, alcohol, or the like, as a means of supplying heat, it being understood that an electric heater of the commercial type may be employed for the purpose of supplying the said heat. The lamp 10, is positioned or placed in the heat box 11, or container, preferably of box-like construction and provided with a supplementary heat box 12, attached thereto, having a door 13, hinged thereto, as at 14, and provided with a knob 15, and catch. The flue chamber 16, is attached to, or integral with the heat box 11. The flue chamber 16 is of rectangular, box-like construction, open at the top, and extends under the water trough 17, or container, and is provided with a curved upper edge 18, adapted to engage the curved edge of the flue chamber 16, as a means of holding the water trough 17 in position.

The flue chamber 16 extends beyond the water trough 17, so as to provide a space for the faucet 19. The door 20 is hinged, as at 21, to the flue chamber 17, so as to be hinged or swung inwardly, as a means of deflecting the heat from the lamp 10 upwards, directly in contact with the faucet 19. The lamp 10 is provided with a chimney 22, having a curved upper portion 23, so as to deflect the heat from the said lamp under the water trough 17. The above described construction being such as will also take the chill off the water 24 in the water trough 17, as well as preventing the cold or frost from freezing the water in the faucet 19, the latter being accomplished as above set forth.

The buoyant member 25, or float, is of rectangular hollow construction, and is adapted to float on the water 24 in the water trough 17. The clip 26, is attached to the float 25. The arm 27 is pivotally attached at one extremity to the clip 26, and is secured to the fulcrum 28, which is hinged, intermediate, as at 29, to the extended element 30, of the faucet 19. The fulcrum 28 is pivotally attached to the link 31. The link 31 is pivotally attached to the fulcrum 32. The fulcrum 32 is hinged, as at 33, to the extended element 34 of the faucet 19. The fulcrum 32, is provided with an aperture, intermediate thereof, adapted to engage the neck portion 35, of the pin 36, which is provided with enlarged portions, adapted to secure the said engagement, and which is provided with a tapered lower element, adapted to engage in a similar tapered aperture 37, formed in the body of the faucet 19, as a means of closing off the supply of water to the water trough 17, when the water trough 17 is full, as is obvious by the above description, it being understood that the faucet 19 is connected, by means of the pipes 38 and 39, and the union 40, and the elbow 41, to any suitable, convenient source of water supply. The latter mentioned elements are positioned or placed under the ground 42, which may be insulated or suitably arranged, so as to prevent freezing of the said elements in cold weather.

The roof 43 is provided with pitched side elements, and has attached at its lower edges, clips 44, adapted to engage the upright members 45, attached to and extended upwardly from the flue box 16. The roof 43 extends over the water trough 17, and is provided as a means of preventing the poultry, when drinking from the water trough 17, from standing on or in the said water trough, which would interfere with the functioning of the buoyant member 25, or the faucet 19, and connected mechanism.

As a means of draining the water 24 from the water trough 17, I have provided a pipe 46, threadedly attached, at its lower extremity, to an aperture formed in the bottom of the water trough 17. The pipe 46, extends above the upper edge of the water trough 17, and has threadedly attached thereto, the usual 45° elbow 47, adapted to be engaged by a wrench handle, bar, rod, or the like, as a means of removing the pipe 46, for the purpose as above set forth. The pipe 48, is threadedly attached at its upper extremity to flanged fitting 49, intercommunicative with the above-mentioned aperture formed in the bottom of the water trough 17, and extends downwardly into the ground which is insulated as above stated, as a means of handling the water drained from the water trough 17.

Having thus described my invention, what I claim as new and desire to protect by Letters Patent of the United States is as follows:

1. A poultry fountain comprising a container having an enlargement at one end thereof, a lamp disposed in said enlarged portion, a partition in said container having a central rectangular opening therein, a tank comprising outwardly disposed edge portions disposed through the opening in said partition and suspended therefrom by said edge portions into the space below said partition, a supply pipe disposed through an opening in the bottom of said container and through a registering opening in said partition, a faucet on the upper end of said supply pipe having its discharge end disposed above said tank for delivering water thereto, and a door hinged to the other end of said container adapted to be rotated inwardly for directing heat from said lamp upwardly in the direction of said faucet to prevent freezing thereof.

2. A poultry fountain comprising a substantially rectangular housing having an enlarged portion at one end thereof, a lamp disposed in said enlarged portion, a partition in said housing dividing the same into an upper and a lower chamber, the space within the enlarged portion being communicative with the space below said partition and separated from the space thereabove, a tank projecting through an opening in said partition into the space therebelow, the bottom of said tank being spaced apart from said housing for providing a free and unobstructed passage for air heated by said lamp, and a door hinged to the opposite end of said housing adapted to be positioned at an inclination to the bottom thereof for directing the air heated by said lamp upwardly.

In testimony whereof I have affixed my signature.

FRANK R. THALKEN.